March 10, 1964 S. W. GREY 3,124,751

POLARITY INSENSITIVE PULSE SYNCHRONIZING SYSTEM

Filed Dec. 4, 1959 2 Sheets-Sheet 1

INVENTOR
STANLEY W. GERY
BY
ATTORNEY

POLARITY INSENSITIVE PULSE SYNCHRONIZING SYSTEM

Filed Dec. 4, 1959 2 Sheets-Sheet 2

INVENTOR
STANLEY W. GERY
BY Henry Huff
ATTORNEY 3,124,751
Patented Mar. 10, 1964

3,124,751

POLARITY INSENSITIVE PULSE SYNCHRONIZING SYSTEM

Stanley W. Gery, Old Bethpage, N.Y., assignor to Sperry Rand Corporation, a corporation of Delaware Filed Dec. 4, 1959, Ser. No. 857,432
8 Claims. (Cl. 325—419)

The present invention relates to means for synchronizing a locally generated series of recurrent pulses with a predetermined point on the envelopes of a received series of recurrent pulsed carrier signals. More particularly, the invention is concerned with such synchronization of the locally generated series of pulses without any instability attributable to the arbitrary carrier phase of the received pulse signals.

Many techniques are available in the art for synchronizing a locally generated series of pulses with a received series of pulsed carrier signals. A loran receiver is one familiar example of apparatus wherein such synchronization is effected. In the case where the synchronization is to be achieved with a high order of precision, it is required that the locally generated pulses be synchronized to a predetermined point on the envelopes of the received pulsed carried signals. Mere alignment of the local pulses anywhere along the envelopes of the received signals is insufficient.

A typical system for the precision synchronization of locally generated pulses with received pulsed signals is disclosed in Patent 2,636,988 issued on April 28, 1953, in the name of Winslow Palmer and assigned to the present assignee. According to said patent, the received pulsed carrier signals are first detected and then shaped into symmetrical bidirectional pulses having a zero crossover point coinciding with the occurrence of the peak of the received signals. The symmetrical bidirectional pulses are applied with the locally generated pulses to a time discriminator to produce an error signal. The amplitude of the error signal is related to the time displacement of the locally generated pulses from the occurrence of the zero crossover point of the symmetrical bidirectional pulses. The polarity of the error signal is indicative of the sense of said displacement.

A conventional amplitude detector is utilized in the aforesaid patent for detecting received pulsed carrier signals. Thus, the polarity of the detected signals and the sense of the aforementioned error signal remain the same independent of the phase of the carrier signal. The sense of the error signal could be inverted, however, if the polarity of the detected signal were reversed. The reversal in polarity of the detected signal is commonly encountered where phase sensitive detectors are employed for the demodulation of the received pulsed carrier signals. One representative system providing for such phase sensitive signal demodulation is disclosed in Patent 2,783,371 issued on February 26, 1957, in the name of Robert L. Frank and assigned to the present assignee.

It is the principal object of the present invention to provide means for the synchronization of a locally generated series of pulses with a predetermined point on the envelopes of received pulsed carrier signals.

Another object is to provide means for the synchronization of a locally generated series of pulses with received pulsed carrier signals whereby the synchronization is stabilized against changes in carrier phase of the received signals.

A further object is to provide means for synchronizing a locally generated series of pulses with a predetermined point on the phase demodulated envelopes of received pulsed carrier signals.

These and other objects of the invention, as will appear from a reading of the following specification, are accomplished in a preferred embodiment by the provision of receiving apparatus including a phase sensitive detector for demodulating received pulsed carrier signals. A local oscillator provides the reference signal for the phase sensitive detector. The nominal frequency of the local oscillator is the same as that of the carrier of the received signals. The initial phase of the local oscillator signal is arbitrarily related to the carrier phase of the received signals. The polarity of the demodulated pulsed signals at the output of the phase sensitive detector is determined by the relative phase between the received signal carrier and the local oscillator signal.

The demodulated pulsed signals are compared in a time discriminator with a locally generated series of pulses having nominally the same repetition rate as that of the received pulsed carrier signals. As a result of said comparison, an error signal is produced which is proportional to the time displacement of a point on the locally generated pulses from a predetermined point on the envelopes of the demodulated pulses. Means are provided for eliminating the dependence of the error signal polarity on the polarity of the demodulated pulses and for making the error signal polarity dependent only on the sense of the actual time displacement of the locally generated pulses from the predetermined point on the envelopes of the demodulated pulses. The error signal is used to adjust the timing of the locally generated pulses so as to reduce said time displacement to zero whereby said pulses are properly synchronized with a predetermined point on the envelopes of the received pulsed carrier signals.

For a more complete understanding of the present invention, reference should be had to the following specification and to the appended figures of which:

Figure 1:
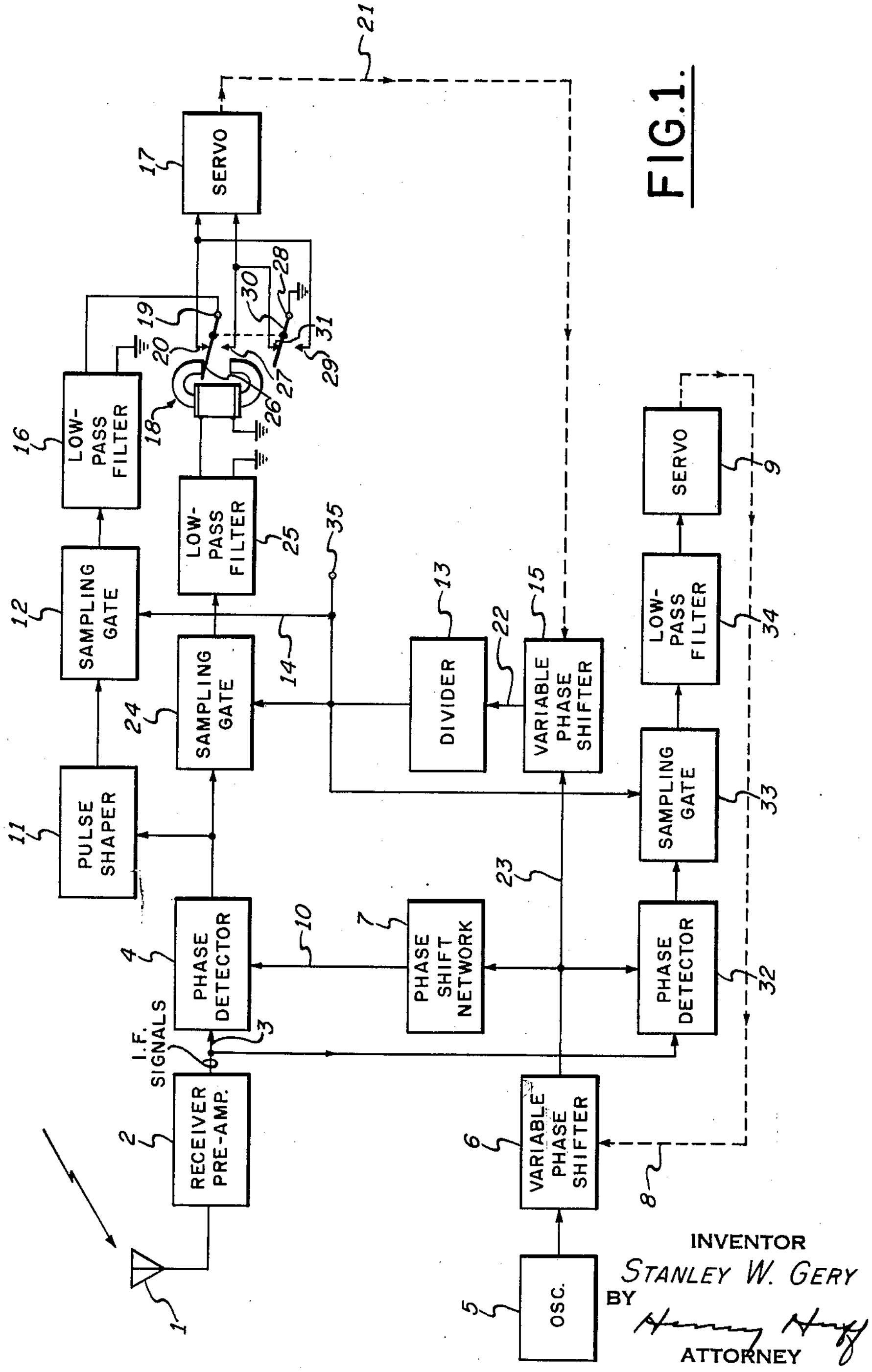
FIG. 1 is a simplified block diagram of a preferred embodiment.

In FIG. 1, a repetitive series of pulsed carried signals are received by antenna 1 and applied to receiver preamplifier 2. Preamplifier 2 produces on line 3 amplified I.F. signals corresponding to the received pulsed carrier signal. The I.F. signals are applied to the first input of phase detector 4. The locally generated reference signal for detector 4 is derived from oscillator 5. The frequency of the signal produced by oscillator 5 is nominally the same as that of the carrier of the received pulsed signals.

The output signal of oscillator 5 is applied via variable phase shifter 6 and fixed phase shift network 7 to the reference signal input 10 of phase detector 4. The magnitude of the phase shift introduced by phase shifter 6 is determined by the angular displacement of mechanical shaft 8 driven by servo 9. Phase shifter 6 may comprise, for example, a conventional electromechanical phase shifter including a resolver and phase splitting network. Phase shift network 7 produces a 90° phase shift between the output signal of phase shifter 6 and the second input 10 of phase detector 4.

Assuming, for purposes of illustration, that the reference signal of line 10 is in phase with the I.F. signals of line 3, pulses of positive polarity will be produced at the output of phase detector 4. This is shown more clearly in the waveforms of FIG. 2 of which waveform A represents the pulsed I.F. signal, waveform B represents the reference signal output of network 7 and waveform C represents the demodulated pulsed signal at the output of phase detector 4. The demodulated signal is applied to pulse shaper 11 which produces the symmetrical bidirectional pulse D in response to each demodulated pulse C. Pulse shaper 11 includes a circuit for differentiating the demodulated pulses C as shown in the aforementioned Patent 2,636,988. It will be noted that the bidirectional waveform D has a zero crossover point 0 coinciding in time with the occurrence of the peak of demodulated pulse C.

The bidirectional waveform D is applied to the first input of sampling gate 12. Sampling gate 12 is actuated, i.e., rendered conductive, by pulses derived from divider 13 and applied via line 14. The repetition rate of the pulses produced by divider 13 is nominally the same as the repetition rate of the pulsed carrier signals received by antenna 1 and, in the preferred embodiment, is subharmonically related to the signal produced by oscillator 5. The signal produced by oscillator 5 is applied to the input of divider 13 via variable phase shifters 6 and 15. Thus, the combination of oscillator 5, variable phase shifters 6 and 15 and divider 13 together comprise a local source of pulses having a repetition rate substantially the same as that of the incoming pulsed carrier signals. It should be noted, however, that said combination can be replaced by a local source of pulsed signals independent of oscillator 5, if desired.

Figure 2:
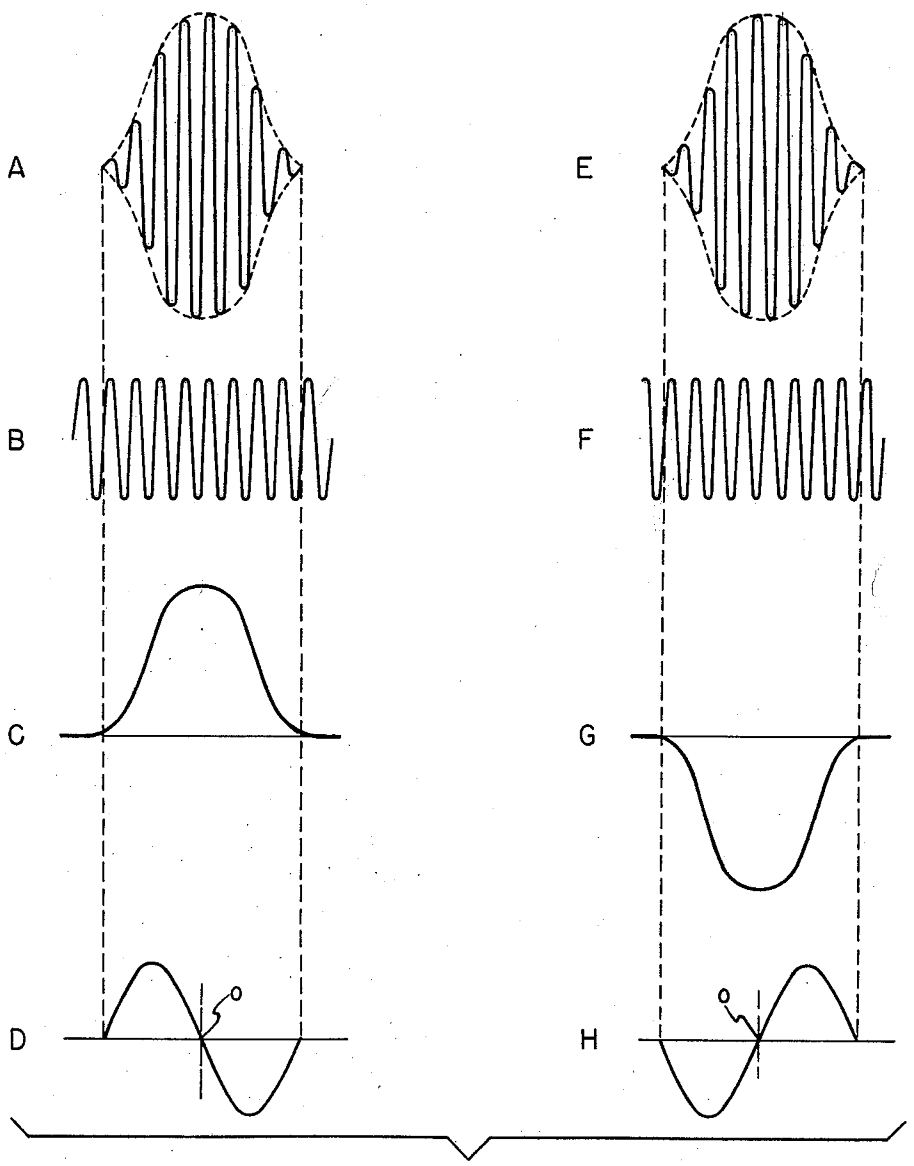
FIG. 2 is a series of waveforms useful in explaining the operation of the apparatus of FIG. 1.

By reference to waveform D of FIG. 2, it will be seen that a positive signal will be passed by sampling gate 12 in the event that the pulses of line 14 precede the occurrence of crossover point 0 of waveform D at the output of pulse shaper 11. Conversely, a negative signal will be produced at the output of sampling gate 12 in the event that the pulses of line 14 occur subsequent to the occurrence of said zero crossover point. The D.C. component of the output signal of sampling gate 12 is extracted in low pass filter 16. Said D.C. component is then utilized as an error signal for controlling servo 17.

In the position shown for polarized relay 18, the error signal is applied by contacts 19 and 20 to servo 17. The sense of the displacement of output shaft 21 of servo 17 is determined by the polarity of the error signal. Shaft 21 drives variable phase shifter 15 to vary the phase of the output signal on line 22 relative to the phase of the input signal on line 23. In typical null-seeking servo fashion, servo 17 is driven by the applied error signal to phase shift the signal on line 22 in a direction so as to cause the concurrence of the pulses on line 14 (at the output of divider 13) and zero crossover point 0 of the signal D at the ouput of pulse shaper 11. The synchronized pulses are made available at output terminal 35.

It will be recalled that a zero phase relationship was assumed between the two input signals to phase detector 4. The above-described operation of servo 17 is based on that assumption. However, the phase of the reference signal on line 10 initially may have any arbitrary relationship with respect to the phase of the I.F. signals on line 3. For example, the two input signals of phase detector 4 may be 180° phase displaced with respect to each other. This is shown in the waveforms E and F of FIG. 2. In the event that two input signals to phase detector 4 are related in phase as shown in waveforms E and F, the demodulated output pulse will be of negative polarity as indicated in waveform G. Bidirectional signal H is produced by pulse shaper 11 in response to the negative demodulated pulse G.

It will be noted that the slope of waveform H is opposite in sense to the slope of waveform D about the respective zero crossover point 0. Consequently, the polarity of the pulses produced at the output of the sampling gate when waveform H is being sampled is opposite to the polarity of the output pulses when waveform D is being sampled for the same time displacement between the sampling pulses of line 14 and the occurrences of the respective crossover point 0. The same polarity inversion will be present in the servo error signal produced at the output of low-pass filter 16. In such a case, servo 17 would drive the sampling pulses of line 14 away from the zero crossover point of waveform H. Proper synchronization would depend upon the sampling of waveform D.

Means are provided by the present invention to ensure the proper synchronizing operation of servo 17 irrespective of whether waveforms D or H are being applied to sampling gate 12. Such means includes sampling gate 24, low-pass filter 25 and polarized relay 18. The demodulated output pulse of phase detector 4 is applied to a first input to sampling gate 24. Gate 24 is actuated concurrently with sampling gate 12 by the locally generated pulses of line 14. The D.C. component of the output signal of gate 24 is extracted in low-pass filter 25. The output signal of filter 25 actuates movable member 26 of relay 18 in a direction determined by the polarity of the signal output of filter 25. Relay 18 and its associate contacts operate to invert the polarity of the error signal input to servo 17 depending upon the sense of the actuation of relay 18.

A signal of positive polarity will be produced at the output of sampling gate 24 when the phase relationship between the input signals of phase detector 4 are as shown in waveforms A and B. It is assumed that the positive polarity output signal of sampling gate 24 actuates relay 18 whereby ganged movable members 26 and 30 interconnect contacts 19 and 20 and contacts 28 and 31. As previously explained, this will result in the stable synchronizing operation of servo 17 whereby the sampling pulses of line 14 are aligned with the zero crossover point of waveform D.

On the other hand, a signal of negative polarity will be produced at the output of sampling gate 24 in the event that the phase relationship between the input signals applied to phase detector 4 are as shown in waveforms E and F. The negative polarity output of sampling gate 24 will actuate ganged movable members 26 and 30 of polarized relay 18 to positions opposite those shown to interconnect contacts 19 and 27 and contacts 28 and 29. In the latter position of ganged members 26 and 30, the error signal input connection to servo 17 is reversed resulting in an inverted sense of displacement at output shaft 21. The inverted sense of displacement of shaft 21, in turn, properly drives the sampling pulses of line 14 toward the zero crossover point of waveform H.

In the normal quiescent operation of the apparatus of FIG. 1, a zero phase relationship will obtain between the reference and I.F. signal inputs to phase detector 4. Such phase relationship is produced by the operation of an auxiliary servo loop comprising variable phase shifter 6, phase detector 32, sampling gate 33, low-pass filter 34, servo 9 and shaft 8. Phase detector 32 receives the same I.F. signal input as does phase detector 4. The reference signal input to phase detector 32, however, is in phase quadrature with the reference signal input of phase detector 4. The quadrature phase relationship is produced by phase shifter 7.

The demodulated output pulse of phase detector 32 is sampled in gate 33 by the same pulses of line 14 which actuate sampling gates 12 and 24. The D.C. component of the output signal of sampling gate 33 is extracted in low-pass filter 34 and is applied as an error signal to servo 9. Servo 9, in response to the error signal output of filter 34, positions shaft 8 to vary phase shifter 6 to produce a quadrature phase relationship between the reference signal and I.F. signal inputs to phase detector 32. As is well understood in the art, no D.C. component appears at the output of a conventional phase detector in the event that its alternating input signals are in a 90° phase relationship with respect to each other. Thus, servo 9 operates to adjust phase shifter 6 until the quadrature phase relationship obtains at the inputs of phase detector 32, whereupon the D.C. error signal actuating servo 9 reduces to zero.

It should be observed, however, that although servo 9 ultimately produces an in-phase relationship between the input signals at phase detector 4 (corresponding to a quadrature phase relationship between the input signals to phase detector 32), the operation of servo 9 is not instantaneous. During the time in which servo 9 is in the process of establishing the proper phase relationship between the signal inputs to phase detector 4, the actual instantaneous phase relationships are arbitrary. The transient condition of the arbitrary phase relationship between the input signals to phase detector 4 gives rise to the situation wherein servo 17 may fail to properly synchronize the pulses of line 14 with the zero crossover point of the symmetrical bidirectional wave (D or H) applied to the input of sampling gate 12. This undesirable situation is eliminated by the operation of sampling gate 24, low-pass filter 25, and polarized reversing relay 18 in the described manner.

From the preceding, it can be seen that the objects of the present invention have been achieved by the provision of means for synchronizing a locally generated series of pulses with a predetermined point on a received series of pulsed carrier signals. The invention permits the use of a phase sensitive detector for the demodulation of the received signals and at the same time maintains proper stability of the synchronizing apparatus irrespective of the arbitrary phase of the carrier of the received pulse signals.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus for synchronizing a first series of unipolar pulses with a predetermined point on the envelopes of a second series of pulses, said second series of pulses being of either positive or negative polarity, said apparatus comprising a source for producing said first pulses, means for comparing the times of occurrence of said first pulses and said predetermined point of said second pulses to produce an error signal representative of any misalignment therebetween, control means connected to said source and responsive to said error signal for modifying the times of occurrence of said first pulses, means for developing a control signal when said second pulses are of a predetermined polarity, and means for selectively reversing the sense of operation of said control means in response to said control signal.

2. Means for synchronizing a first series of pulses with a predetermined point on the envelopes of a second series of pulses, said second series of pulses being of either positive or negative polarity, said means comprising a source for producing said first pulses, said first pulses nominally being of the same repetition rate as that of said second pulses, pulse shaping means for converting said second pulses into bidirectional pulses, said bidirectional pulses having a zero crossover coincident with said predetermined point of said second pulses, means for comparing the times of occurrences of said first pulses and said crossover point of said second pulses to produce an error signal representative of any misalignment therebetween, control means connected to said source and responsive to said error signal for modifying the timing of said first pulses relative to said bidirectional pulses, means for producing a control signal when said second pulses are of a predetermined polarity, and means for selectively reversing the sense of operation of said control means in response to said control signal.

3. Apparatus for synchronizing a locally generated series of pulses with a predetermined point on the envelopes of a received series of pulsed carrier signals comprising phase sensitive means for demodulating said received signals, a source for producing said locally generated pulses, means for comparing the times of occurrence of said locally generated pulses and the predetermined point of the demodulated pulses corresponding to said predetermined point of said received pulsed signals to produce an error signal representative of any misalignment therebetween, servo means connected to said source and responsive to said error signal for modifying the timing of said locally generated pulses relative to said demodulated pulses so as to synchronize the former with said predetermined point of the latter, means connected to said demodulating means for producing a control signal when said demodulated pulses are of a predetermined polarity, and means for selectively reversing the sense of operation of said servo means in response to said control signal.

4. Apparatus for synchronizing a locally generated series of pulses with a predetermined point on the envelopes of a received series of pulsed carrier signals comprising phase sensitive means for demodulating said received signals, a source for producing said locally generated pulses, pulse shaping means connected to said demodulating means for converting the demodulated pulses into bidirectional pulses, said bidirectional pulses having a zero crossover coincident with said predetermined point of said signals, means for comparing the times of occurrence of said locally generated pulses and said crossover point of said bidirectional pulses to produce an error signal representative of any misalignment therebetween, control means connected to said source and responsive to said error signal for modifying the timing of said locally generated pulses relative to said bidirectional pulses so as to synchronize the former with said crossover point of the latter, means connected to said demodulating means for producing a control signal when said demodulated pulses are of a predetermined polarity, and means for selectively reversing the sense of operation of said control means in response to said control signal.

5. Apparatus as defined in claim 4 wherein said means for selectively reversing comprises means for selectively applying said error signal to said control means, said last-named means inverting said error signal in response to said control signal.

6. A receiver for synchronizing a locally generated series of pulses with a predetermined point on the envelopes of an incoming series of pulsed carrier signals comprising means for receiving said carrier signals, a first source of first signals nominally having the same frequency as that of the carrier of said incoming signals, phase sensitive means connected to said receiving means and to said first source for demodulating said incoming signals, means connected to said receiving means and to said first source for establishing a predetermined phase relationship between the carrier of said incoming signals and said first signal, a second source of locally generated pulses nominally having the same repetition rate as that of said incoming pulsed carrier signals, means for comparing the times of occurrence of said locally generated pulses and a predetermined point of the demodulated pulses corresponding to said predetermined point of said incoming pulsed carrier signals to produce an error signal representative of any misalignment therebetween, servo means connected to said second source and responsive to said error signal for modifying the timing of said locally generated pulses relative to said demodulated pulses so as to synchronize the former with said predetermined point of the latter, means connected to said demodulating means for producing a control signal when said demodulated pulses are of a predetermined polarity, and means for selectively reversing the sense of operation of said servo means in response to said control signal.

7. Apparatus as defined in claim 6 wherein said means for comparing comprises pulse shaping means connected to said demodulating means for converting the demodulated pulses into bidirectional pulses having a zero crossover coincident with said predetermined point of said demodulated pulses, and means for comparing the times of occurrence of said locally generated pulses and said crossover point of said bidirectional pulses to produce said error signal.

8. Apparatus as defined in claim 6 wherein said second source comprises said first source and a frequency divider circuit connected to the output of said first source, said locally generated pulses being produced by said frequency divider.

References Cited in the file of this patent

UNITED STATES PATENTS

| | | |
|---|---|---|
| 2,232,390 | Katzin | Feb. 18, 1941 |
| 2,504,293 | Beard | Apr. 18, 1950 |
| 2,783,371 | Frank | Feb. 26, 1957 |
| 2,934,604 | Bizet | Apr. 26, 1960 |
| 2,935,609 | Rabin et al. | May 3, 1960 |